United States Patent [19]

Ando et al.

[11] 4,407,184

[45] Oct. 4, 1983

[54] PNEUMATIC SERVO BOOSTER

[75] Inventors: Hiromi Ando, Tokyo; Kiyoshi Tateoka, Fujisawa, both of Japan

[73] Assignee: Tokico Ltd., Kanagawa, Japan

[21] Appl. No.: 209,214

[22] Filed: Nov. 20, 1980

[30] Foreign Application Priority Data

Nov. 26, 1979 [JP] Japan ................ 54-163425

[51] Int. Cl.³ .................... F15B 9/10; F16J 15/18
[52] U.S. Cl. ................................ 91/376 R; 92/168; 277/189
[58] Field of Search .......... 92/168; 91/369 A, 369 B, 91/369 R, 376 R; 277/189, 183, 182, 181

[56] References Cited

U.S. PATENT DOCUMENTS 3,049,356  8/1962  Talamonti ................... 277/183
3,807,279  4/1974  Weatherhogg ............ 91/369 B
3,824,894  7/1974  Nicholas ..................... 91/369 B

FOREIGN PATENT DOCUMENTS 666158  7/1963  Canada ...................... 91/369 A
50-38797  12/1975  Japan .

Primary Examiner—Paul E. Maslousky
Attorney, Agent, or Firm—Wenderoth, Lind & Ponack

[57] ABSTRACT

A pneumatic servo booster includes a shell housing consisting of front and rear shells, a valve body incorporating therein a valve mechanism and sealingly extending through and being slidably supported by the rear shell, and a reinforcing plate provided on the inner surface of the rear shell. The inner circumference of the reinforcing plate is utilized to locate a seal member which is provided between the rear shell and the valve body.

1 Claim, 5 Drawing Figures

PNEUMATIC SERVO BOOSTER

BACKGROUND OF THE INVENTION

This invention relates to pneumatic servo boosters and, particularly to pneumatic servo boosters including a shell housing consisting of front and rear shells, a valve body incorporating therein a valve mechanism and sealingly extending through and being slidably supported by the rear shell, and a flexible diaphragm connected to the valve body and partitioning the interior of the shell housing into two front and rear chambers.

In a conventional vacuum servo booster, the two chambers are at a vacuum pressure in the non-actuated condition, and in actuating the servo booster by such as depressing a brake pedal, the valve mechanism firstly intercepts the communication between the two chambers and, secondly, introduces atmospheric air into the rear chamber thereby generating a differential pressure across the diaphragm. The diaphragm together with the valve body is displaced forwardly in generating an output force. The valve body sealingly extends through the rear shell and is slidably supported by the rear shell. A seal member is located on the inner surface of a rearwardly extending tubular portion of the rear shell, and the seal member is located between an annular flange formed on the rear end of the tubular portion and a resilient retaining ring which is fitted in the tubular portion. However, there are shortcomings in that the construction is complicated, the number of parts increases, the assembling operation is troublesome and the retaining force of the resilient retaining ring varies due to the manufacturing tolerance of the retaining ring and of the inner diameter of the tubular portion.

SUMMARY OF THE INVENTION

An object of the present invention is to avoid the shortcmings aforementioned by utilizing a reinforcing plate. The retaining plate is usually secured to the inner surface of the rear shell for increasing the strength and the rigidity of the rear shell, thereby enabling a plurality of mounting bolts to be mounted on the rear shell to mount the servo booster on such as a wall partitioning a driver's compartment of a vehicle from such as an engine compartment.

According to the invention, an annular reinforcing plate is mounted on the inner surface of the rear shell and, the inner circumferential end of the reinforcing plate is utilized to locate the seal member.

BRIEF DESCRIPTION OF THE DRAWINGS

Further objects and advantages of the invention will now become apparent from the following description taken in conjunction with the accompanying drawings, in which.

DETAILED DESCRIPTION OF THE PREFERRED EMBODIMENTS

Figure 1:
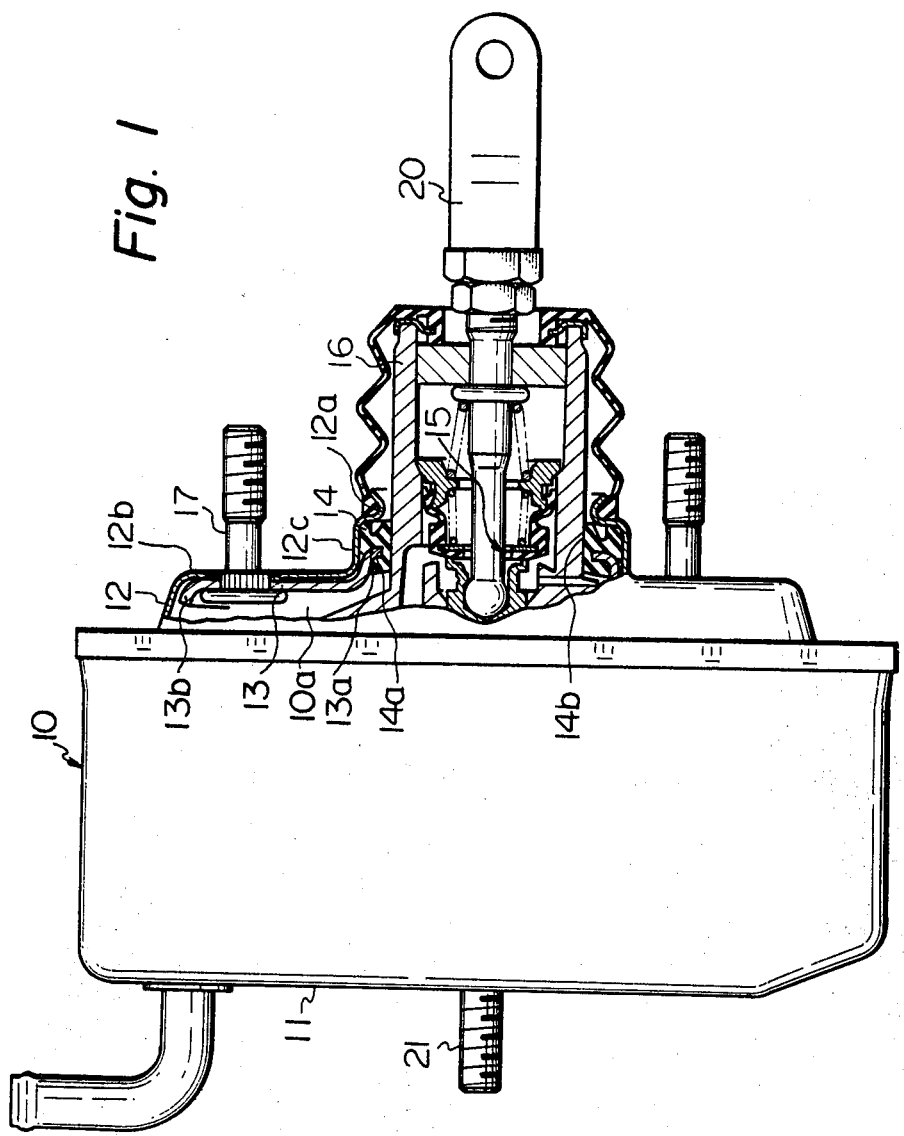
FIG. 1 is a partially broken side view of a servo booster according to the invention.

The pneumatic servo booster illustrated in FIG. 1 comprises a shell housing 10 consisting of a front shell 11 and a rear shell 12, a valve body 16 incorporating therein a valve mechanism 15, and a flexible diaphragm (not shown) connected to the valve body 16 and to the inner circumference of the shell housing 10 to partition the interior of the shell housing into a front chamber (not shown) and a rear chamber 10a. In the non-actuated condition shown in FIG. 1 the valve mechanism 15 communicates the front and rear chambers, and when the valve mechanism 15 is actuated by moving leftwards an input rod 20, the valve mechanism 15 firstly intercepts the communication between front and rear chambers and, then, communicates the rear chamber 10a with the atmosphere. Thus, a differential pressure is generated across the diaphragm, and an output force is transmitted to such as a piston of a master cylinder (not shown) through an output rod 21.

Further, there is provided an annular reinforcing plate 13 on the inner surface of the rear shell 12, and a plurality of mounting bolts 17 (only two are shown in FIG. 1) pass through the reinforcing plate 13 and the rear wall 12b of the rear shell 12 for mounting the pneumatic servo booster on such as a partitioning wall which partitions an engine compartment from a driver's compartment of an automotive vehicle.

Figure 5:
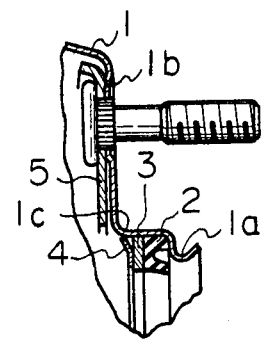
FIG. 5 is a partial sectional view of a prior art servo booster.

The valve body 16 slidably and sealingly passes through the rear shell 12. In a typical prior art pneumatic servo booster shown in FIG. 5, there is provided an annular flange 1a on the rear end of a rearwardly extending tubular portion 1c of a rear shell 1, and a seal member 2 and a bearing 3 are mounted in the tubular portion 1c as shown in FIG. 5. The seal member 2 sealingly engages with a valve body, and the bearing 3 slidably supports and guides the valve body. A resilient retaining ring 4 is forcibly fitted in the tubular portion 1c to locate the seal 2 and the bearing 3. However, the retaining force of the retaining ring 4 varies substantially due to the manufacturing tolerance between the tubular portion 1c and the retaining ring 4, thus, the seal member 2 and the bearing 3 cannot reliably be retained.

Referring again to FIG. 1, according to the invention, the inner circumference 13a of the reinforcing plate 13 acts to locate a seal member 14. In the illustrated embodiment, the seal member 14 seals the gap between a rearwardly extending tubular portion 12c of the rear shell 12 and the valve body 16 and slidably supports the valve body 16. The seal member 14 has an annular groove 14a, and the inner circumference 13a of the reinforcing plate 13 is snugly fitted in the groove 14a. Thus, the axial movement of the seal member 14 can reliably be prevented by the reinforcing plate 13. Preferably, the inner circumference 13a of the reinforcing plate 13 is displaced rearwardly (to the right as seen in FIG. 1) from the major portion of the reinforcing plate 13. Further, an annular flange 13b is formed on the outer circumference of the retaining plate 13.

The operation of the pneumatic servo booster shown in FIG. 1 is similar to the prior art pneumatic servo booster and is well known to those skilled in the art, thus, the description therefor is omitted accordingly. However, it will be noted that the seal member 14 is reliably retained by the reinforcing plate 13 over a long period of usage, and the operational characteristics of the servo booster can reliably be maintained.

Figure 2:
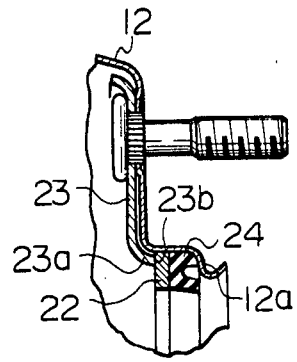
FIG. 2 is a partial sectional view showing the essential portion of the invention but showing a modified form.
Figure 3:
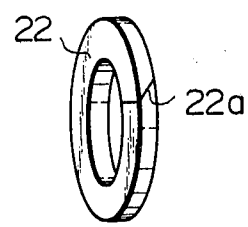
FIG. 3 is a perspective view of a bearing incorporated in the servo booster of FIG. 2.
Figure 4:
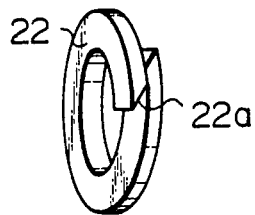
FIG. 4 is a perspective view of the bearing of FIG. 3 but shown in an unassembled condition.

FIGS. 2-4 show another embodiment, wherein the inner end portion 23a of a reinforcing plate 23 has the form of a rearwardly extending annular flange with the rear end 23b thereof abutting with an annular bearing 22. An annular seal member 24 is located between the flange 12a of the rear shell and the bearing 22. The bearing 22 is preferably formed of a resilient and low friction material such as nylon or polyacetal to slidably support the valve body and prevent the radial displacement thereof. Preferably, an inclined cut 22a is formed in the bearing 22 as shown in FIGS. 3 and 4 so that the bearing 22 can easily be mounted on or dismounted from the valve body 16.

As described heretofore, according to the invention, the reinforcing plate provided on the inner surface of the rear shell to reinforce the strength and the rigidity thereof is utilized to locate a seal member which is provided between the rear shell and the valve body. Thus, it is possible to omit any additional members such as a retaining ring and to increase the operational reliability of the servo booster. Although the embodiments shown in the drawings relate to a so-called vacuum servo booster, it will be noted that the invention may be applied to other types of pneumatic servo boosters.

What is claimed is:

1. A pneumatic servo booster comprising:
   a shell housing formed of front and rear shells;
   a valve body incorporating therein a valve mechanism, said valve body sealingly extending through and being slidably supported by said rear shell;
   a seal member positioned between said rear shell and said valve body, said seal member having therein an annular groove;
   a reinforcing plate provided on the inner surface of said rear shell, said reinforcing plate comprising an annular member having an inner circumferential end snugly fitted within said annular groove in said seal member without being integrally attached thereto and acting to position said seal member; and
   mounting bolts passing through said reinforcing plate and said rear shell for mounting the booster.

* * * * *